United States Patent [19]

Fischer

[11] Patent Number: 4,964,475
[45] Date of Patent: Oct. 23, 1990

[54] DRILLING DEVICE FOR PRODUCING DRILL HOLES WITH UNDERCUT

[75] Inventor: Arthur Fischer, Waldachtal/Tumlingen, Fed. Rep. of Germany

[73] Assignee: fischerwerke Artur Fischer GmbH & Co KG, Waldachtal/Tumlingen, Fed. Rep. of Germany

[21] Appl. No.: 300,058

[22] Filed: Jan. 23, 1989

[30] Foreign Application Priority Data

Jan. 28, 1988 [DE] Fed. Rep. of Germany ....... 3802421
Jun. 9, 1988 [DE] Fed. Rep. of Germany ....... 3819650

[51] Int. Cl.$^5$ ..................... E21B 17/10; E21B 7/28; E21C 9/00
[52] U.S. Cl. ..................... 175/210; 173/33; 175/213; 175/220; 175/323; 175/408; 408/241 G
[58] Field of Search ............... 175/210, 209, 211, 213, 175/208, 323, 408, 406, 320, 394, 214, 220; 408/241 G, 241 B, 72 B; 173/32, 33

[56] References Cited

U.S. PATENT DOCUMENTS 4,111,270  9/1978  Fischer et al. .................... 175/220
4,372,401  2/1983  Fischer .............................. 175/209

FOREIGN PATENT DOCUMENTS

| 6/36 | 7/1936 | Australia ........................ 175/209 |
| 343315 | 7/1920 | Fed. Rep. of Germany ...... 175/210 |
| 2349998 | 4/1975 | Fed. Rep. of Germany . |
| 3014388 | 10/1981 | Fed. Rep. of Germany . |
| 3027408 | 2/1982 | Fed. Rep. of Germany . |
| 3122422 | 1/1983 | Fed. Rep. of Germany ...... 175/220 |
| 3617932 | 10/1987 | Fed. Rep. of Germany . |
| 2521903 | 8/1982 | France . |
| 703657 | 12/1979 | U.S.S.R. .......................... 175/209 |
| 717317 | 2/1980 | U.S.S.R. .......................... 175/209 |
| 887075 | 12/1981 | U.S.S.R. .......................... 408/241 B |

Primary Examiner—Hoang C. Dang
Attorney, Agent, or Firm—Michael J. Striker

[57] ABSTRACT

A drilling device for producing drill holes with undercuts comprises a drill having a drill shaft with extending drill blades, a shoulder projecting from the drill shaft, and a guiding sleeve surrounding the drill shaft between the shoulder and the drill blades, the guiding sleeve having two ends provided with openings of different sizes, the guiding sleeve having a sleeve edge which forms a support for the shoulder and a wall abutment for the collar.

11 Claims, 2 Drawing Sheets

DRILLING DEVICE FOR PRODUCING DRILL HOLES WITH UNDERCUT

BACKGROUND OF THE INVENTION

The present invention relates to a drilling device for producing drill holes with undercuts and particularly to such a device which has a drill with a drill shaft with projecting drilling plates, and a shoulder extending from the drill shaft.

Drilling devices of the above mentioned general type are known in the art. They are used for forming an undercut at the bottom of the drill hole by turning the drill, in order to insure form-locking anchoring of an expansion plug in the drill hole. The expansion plug inserted in the drill hole engages in the undercut with its expansion part.

The German document No. DE-OS 2,349,998 discloses a which a ball-shaped shoulder is arranged in the drill shaft and serves as a bearing for turning. The collar can abut during turning against a mouth of the drill hole for forming the bearing. In this known drilling device it is possible that the drilling material which is produced during the drilling process cannot be sufficiently evacuated outwardly from the drill hole. Moreover, the turning region is not limited, so that it will not match in an optimal manner an expansion plug to be inserted.

SUMMARY OF THE INVENTION

Accordingly, it is an object of the present invention to provide a drilling device for producing of drill holes with undercuts, which avoids the disadvantages of the prior art.

More particularly, it is an object of the present invention to provide a drilling device of the above mentioned type which has a simple construction and exactly defines a turning region for producing the undercut.

In keeping with these objects and with others which will become apparent hereinafter, one feature of the present invention resides, briefly stated, in a drilling device of the above mentioned type in which a guiding sleeve is arranged around the drill shaft between the shoulder and the drilling blades and is provided with differently sized openings at its both ends, and the guiding sleeve has an edge which serves as a counter support for the shoulder and is a wall abutment for a wall of a drill hole. The edge can be defined by a flange.

When the guiding sleeve which surrounds the drill shaft in the region between the shoulder and the drilling blades is provided with differently sized openings at its ends, the turning region of a drill is accurately defined. One of the openings surrounds the drill shaft so as to provide only a small play therebetween, while the other opening of the sleeve provides for a greater-annular gap between the drill shaft and the edge of the other opening.

In accordance with another feature of the present invention, the openings provided at the ends of the guiding sleeve merge into one another through an inner surface of the sleeve which preferably is conical. The greater opening can be provided at the sleeve end which faces toward the drill tip or on the sleeve end which faces toward the shoulder. In any case the pivot point for the turning movement of the drill is located in the region of the smaller opening.

A sleeve edge abuts against the shoulder projecting from the drill shaft and simultaneously serves as a wall abutment. The sleeve edge on its side which faces toward the wall of the drill hole is provided with a coating. The coating is preferably composed of an elastic material, for example synthetic plastic material or rubber.

The sleeve edge on its side which faces toward the shoulder is provided with a curvature which preferably corresponds to the shape of the shoulder. The curved shoulder in connection with the curved abutment surface formed on the sleeve edge forms a stable turning bearing.

The guiding sleeve can be connected with a suction device for aspirating the drilling material produced during the drilling process. In accordance with an advantageous embodiment, the drill shaft has a plurality of drilling material transporting grooves which transport the produced drilling material through the guiding sleeve outwardly beyond the drill hole.

For preventing damages the guiding sleeve during withdrawal of the drill from the drill hole by the sharp lower edge of the drilling plate, an increased portion is provided in a transition region between the drill shaft and the drilling blades and serves as a retracting abutment. This increased portion is ring-shaped so as to form an edgeless abutment for the opening edge of the guiding sleeve.

The increased portion is preferably formed so that it conically extends from the drill shaft and engages behind the laterally projecting drilling blades their rear sides which face away of the cutting edges. Thereby the connecting region of the conical increased portion forms the edgeless abutment for the guiding sleeve since the increased portion underneath the drilling blades has a greater outer diameter than the diameter of the opening of the guide sleeve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
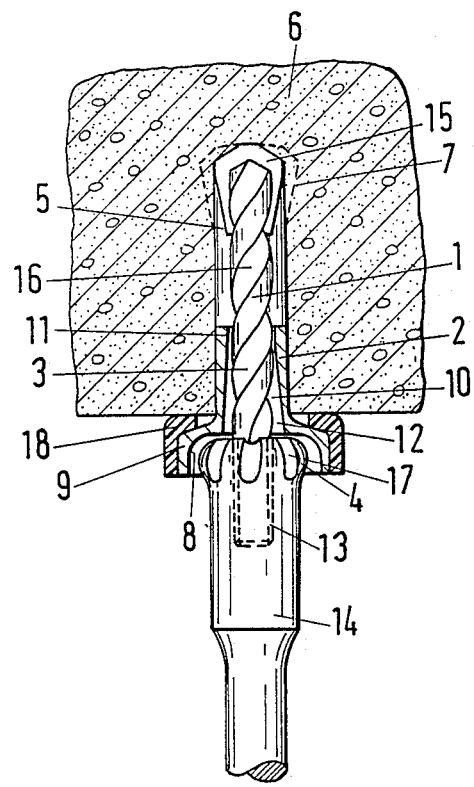
FIG. 1 is a view showing a drilling device in accordance with the present invention, which is inserted in a drill hole of a wall.

A drilling device shown in FIG. 1 has a drill 1, a guiding sleeve 2, and a shoulder 4 extending in the region of a drill shaft. The drilling device is inserted in a drill hole 5 of a masonry 6. During a drilling process, the guiding sleeve 2 serves as a guiding and centering element to prevent lateral deviations of the drill 1.

In the shown position an undercut 7 can be produced by turning the drill 1 as shown in broken lines in the drawing. During the turning process the drill is driven during the production of the drill hole by a not shown drilling machine and simultaneously turned by hand. The collar 4 abuts against a curved abutment surface 8 of an flange of the sleeve. A conical inner surface 10 of the guiding sleeve 2 limits the turning movement which has a pivot point in the region of an opening 11 of the guiding sleeve 2.

The drill 1 is releasably connected with a drill receptacle 14 through a thread 13. Because of this feature the mounting of the guiding sleeve 2 does not pose any difficulties and the drill 1 with worn out drilling blade 15 can be replaced in a simple manner.

The drilling shaft 3 is provided with drilling material guiding grooves 16. They transport the removed drilling material through the opening 11 and through the opening 12 outwardly of the drill hole 5. For accelerating the withdrawal of the drilling material, vane-shaped grooves 17 are provided on the shoulder 4.

Figure 2:
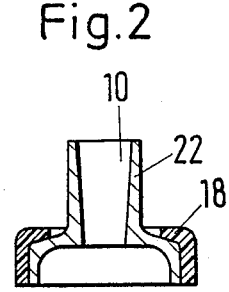
FIG. 2 is a view showing another embodiment of the guiding sleeve of the inventive drilling device.

FIG. 2 shows a guiding sleeve in accordance with another embodiment. In this guiding sleeve which is identified with reference numeral 22, the conical inner surface runs opposite to the inner surface 10 of the guiding sleeve 2 of the embodiment shown in FIG. 1.

Figure 3:
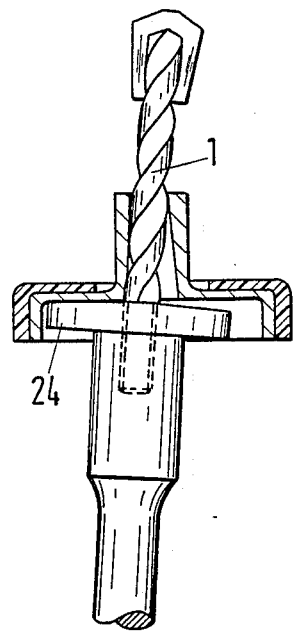
FIG. 3 is a view showing a drilling device in accordance with the present invention with a shoulder of a further embodiment.

FIG. 3 shows another embodiment of a drilling device in accordance with the present invention. Here, instead of the shoulder 4 of the device shown in FIG. 1, a plate-shaped shoulder 24 is provided. The shoulder 24 has a curved bearing surface.

The guiding sleeves 2 and 22 of the embodiments shown in FIGS. 1 and 2 are provided on their flanges 9 with a bearing surface which is composed of a synthetic plastic material and identified with reference numeral 18.

Figure 4:
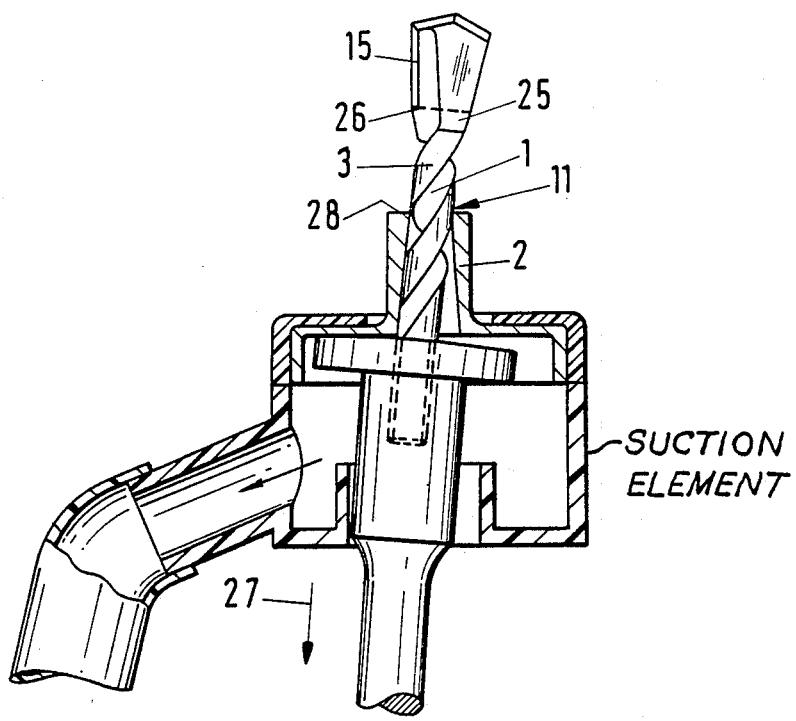
FIG. 4 is a drilling device with a drill shaft having an increased portion.

FIG. 4 shows a drilling device in which the drill shaft 2 has a conically increased portion 25 located immediately under the drill blade. The increased portion 25 is formed so that its diameter under a lower edge of the drill blade 15 is greater than the diameter of the opening 11 of the guiding sleeve 2.

The increased portion 25 forms a retracting abutment. During the retracting of the drill 1 in direction of the arrow 27 with the guiding sleeve 2 fixedly seated in the drill hole 5, the increased portion 25 abuts against an end 28 of the guiding sleeve 2. During further retraction of the drill in the direction of the arrow 27, it is withdrawn from the drill hole 5 together with the guiding sleeve 2. The increased portion 25 which is substantially ring-shaped forms an edgeless abutment for the end 28, so that it is not damaged. Without the increased portion 25, the lower edge 26 of the drill blade 15 would come to abutment against the end 28 and damage the latter. The end 28 could be increased so that the guidance for the drill shaft would be worsened.

The conical increased portion 25 shown in FIG. 4 is presented only as a preferable embodiment of the invention. It is to be understood that a differently shaped shoulder or the like can serve a such an increased portion and form a retraction abutment during the retraction of the drill for the end 28.

It will be understood that each of the elements described above, or two or more together, may also find a useful application in other types of constructions differing from the types described above.

While the invention has been illustrated and described as embodied in a drilling device for producing drill holes with undercuts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A drilling device for producing in a single drilling operation a drill hole having an undercut at its end, comprising a drill shaft (1) of a uniform diameter; a drill plate (5) attached to one end of the drill shaft and having a dimension which exceeds the diameter of the drill shaft; a shoulder (4) provided at the other end of the drill shaft; drill shaft guiding means including a guide sleeve having an upper guide sleeve portion (8) surrounding the drill shaft above the drill hole, a lower guide sleeve portion (2) surrounding the drill shaft within the drill hole, and an annular flange (18) formed on the upper guide sleeve portion to abut at one side thereof against a surface around the drill hole and to engaged the shoulder at the opposite side thereof; the upper guide sleeve portion having a larger inner diameter than the diameter of the shoulder; the lower guide sleeve portion having a uniform outer diameter which substantially corresponds to the diameter of the drill hole, the lower sleeve portion defining two opposite open ends of different inner diameters, and a conical inner surface extending between the two open ends the entire length of the lower guide sleeve portion, one of the open ends having an inner diameter to guide the shaft during straight drilling and to act as a pivot point for the drill shaft when the shoulder abuts against the flange and an undercut is being formed, and the inner diameter of the other open end being larger than the inner diameter of the one open end to permit pivotal movement of the drill shaft during the formation of the undercut.

2. A drilling device as defined in claim 1 wherein the open end of smaller diameter is connected to the upper sleeve portion via said annular flange.

3. A drilling device as set forth in claim 2, further comprising a bearing member for supporting said flange on the wall in which the hole is drilled.

4. A drilling device as defined in claim 3, wherein said bearing member is composed of synthetic plastic material.

5. A drilling device as defined in claim 3, wherein said bearing member is composed of rubber.

6. A drilling device as defined in claim 1, wherein said shoulder is curved.

7. A drilling device as defined in claim 1, wherein said shoulder is ball-shaped.

8. A drilling device as defined in claim 1, and further comprising suction means, said guiding sleeve being connected with said suction means.

9. A drilling device as defined in claim 1, wherein said drilling shaft is provided with a plurality of drilling material transporting grooves.

10. A drilling device as set forth in claim 2, wherein said flange has a curved abutment surface facing said shoulder, said shoulder having a surface for engaging said curved abutment surface.

11. A drilling device as defined in claim 1, wherein the open end of smaller diameter is connected to the upper sleeve portion via the annular flange.

* * * * *